United States Patent [19]
de Neumann

[11] 4,393,515
[45] Jul. 12, 1983

[54] PROCESSOR ARRANGEMENT

[75] Inventor: Frederick B. de Neumann, Rayleigh, England

[73] Assignee: The Marconi Company Limited, Chelmsford, England

[21] Appl. No.: 229,136

[22] Filed: Jan. 28, 1981

[30] Foreign Application Priority Data

Feb. 5, 1980 [GB] United Kingdom ............... 8003814

[51] Int. Cl.³ .............................................. H04B 9/00
[52] U.S. Cl. .................................... 455/606; 455/601; 455/602; 370/3; 370/4; 357/75; 250/551
[58] Field of Search ............... 455/601, 602, 606, 612; 359/901; 357/19, 74, 75; 250/551, 552, 212; 364/200, 900; 307/311; 370/1, 3, 4

[56] References Cited
U.S. PATENT DOCUMENTS 3,385,970  5/1968  Coffin, Jr. et al. ............... 455/612
3,630,015  12/1971  Lehovec ........................... 250/212
3,911,269  10/1975  Hart ................................. 307/311
4,063,083  12/1977  Cathey et al. .................... 455/606

Primary Examiner—Robert L. Griffin
Assistant Examiner—Edward L. Coles
Attorney, Agent, or Firm—Spencer & Kaye

[57] ABSTRACT

A processor arrangement consists of a number of individual autonomous processor units which communicate with each other by means of electro-magnetic waves. The electro-magnetic energy is typically at infra-red optical frequencies. Although the energy necessary to operate the individual processor units can be supplied by means of conductive bus bars, in a preferred arrangement the energy is supplied from a light source at optical frequencies to photo cells mounted on each of the processor units. Each processor arrangement is provided with an input-output device which communicates with the individual processor units by means of electro-magnetic waves and is provided with external conductive leads in a conventional manner. The whole processor arrangement is encapsulated in an evacuated chamber.

19 Claims, 3 Drawing Figures

PROCESSOR ARRANGEMENT

BACKGROUND OF THE INVENTION

This invention relates to a processor arrangement which contains a number of individual processors. In forming a system having a powerful processing capability it can be desirable to constitute the system as a number of individual autonomous processors, rather than to concentrate the whole of the processing capability in a single processor. This enables the system to be more tolerant of faults and to be of more general application. Additionally, the system may be able to handle a number of different tasks simultaneously and consequently to operate in a more efficient manner.

It is becoming usual to fabricate an individual processor in the form of an integrated circuit which is mounted on a stable substrate. It is customary to then encapsulate each processor within its own package to protect it from the effects of the environment and to facilitate connections to other parts of a larger system. Consequently each package is provided with a large number of terminals which are needed to enable the processor to receive raw data, to transmit processed data and to receive power from power supplies etc. The complexity of individual processors increases as they become larger and more complicated, and consequently the number of terminals which are required increases significantly. The difficulty of attaching a large number of terminals to a very small processor is very great. The terminals and their interconnections can constitute a major factor in affecting the reliability and malfunctioning of the processor. This is particularly so in systems which contain a number of interconnected processors. If more than just a very few processors are to be fully interconnected so as to operate together as an integrated system, the number of direct interconnections can become prohibitively large.

SUMMARY OF THE INVENTION

According to this invention, a processor arrangement includes a plurality of individual processors mounted within a common chamber with data communication between at least some of the individual processors being by means of electromagnetic waves.

The electro-magnetic waves may be guided from one processor to another by waveguides—at optical frequencies such waveguides are usually termed optical fibres. Alternatively, and preferably, the electro-magnetic waves are radiated from one processor to another. Each processor may be enabled to communicate directly by this means with all of the remaining individual processors or alternatively each processor may be enabled to communicate directly only with those processors which are most closely adjacent to it. The processors may be provided with the energy necessary to operate them via conductive leads, which are physically attached to them, but preferably this energy is also provided to each processor by the radiation of electro-magnetic energy.

The radiated electro-magnetic energy may be at microwave frequencies, in which case the wavelength of the energy should preferably be of the order of the dimensions of the individual processors. Preferably, however, the radiated electro-magnetic energy is in the form of light, which term is herein taken to encompass the electro-magnetic spectrum, which extends from the infra-red to the ultra violet.

The individual processors are preferably all similar and capable of independent autonomous operation.

Preferably again each processor is provided with the energy necessary to operate it from a common light emissive source which is arranged to illuminate all of the individual processors. Conveniently this light is modulated so as to impart a common reference clock frequency to each processor. Each processor may contain its own clock in which case its frequency of operation should be synchronised to the common clock frequency. It is necessary for all of the processors which are required to communicate directly with each other to possess an optical path by means of which light can be transmitted between them. The light may be transmitted directly in a single straight line or alternatively an intermediate reflector or reflectors can be provided, given that when a large number of individual communicating processors are provided it may be difficult to arrange each in direct line of sight optical communication with the others. All of the processors may be arranged on a single two dimensional surface or alternatively they may be configured in a three dimensional array.

BRIEF DESCRIPTION OF THE DRAWING

The invention is further described by way of example with reference to the accompanying drawings in which.

DESCRIPTION OF THE PREFERRED EMBODIMENTS

Figure 1:
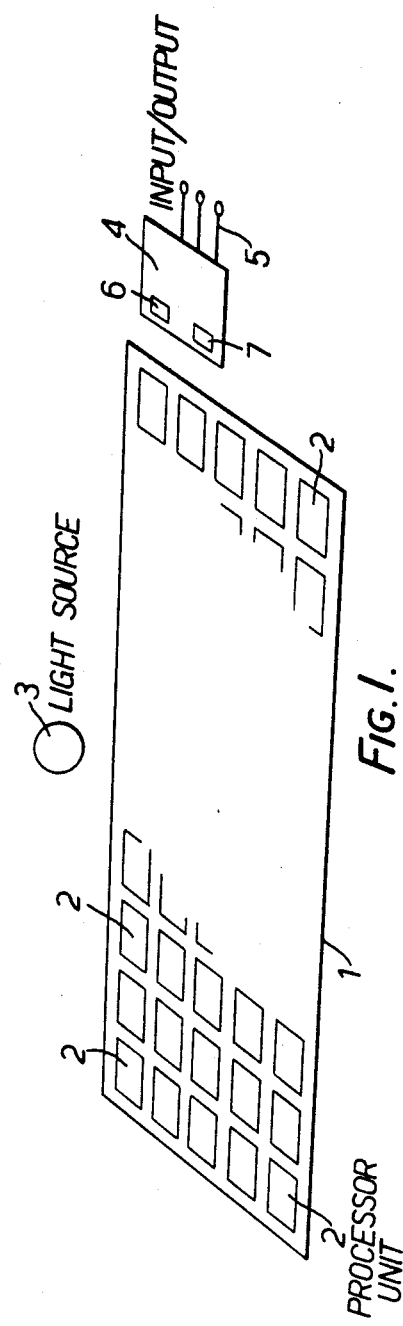
FIG. 1 shows in diagrammatic manner a processor arrangement in accordance with the present invention and FIGS. 2 and 3 show different individual processor units forming part of the processor arrangement.

Referring to FIG. 1, a large stable substrate 1 is provided with a two dimensional array of individual processor units 2 mounted on its upper surface. Each processor unit 2 is a fully autonomous self contained processor, which is electrically insulated from all other processor units. The internal configuration and mode of operation of a particular processor unit 2 is described subsequently with reference to FIG. 2. The processor units 2 receive their operating power via photo cells mounted integrally on each unit so as to receive illumination from a common light source 3. If a large number of individual processor units 2 are provided on a single substrate 1, it may be necessary to provide more than one light source 3 or alternatively to distribute the light to those locations where it is required by means of optical fibres or the like. Additionally, mirror like reflecting surfaces can be provided above or around the substrate 1 so as to ensure a more uniform illumination of the photo cells in the different processor units 2. In practice, the substrate 1 which carries the processor units 2 and also the light source 3 are mounted within an evacuated hermetically sealed chamber. External communication with the processor units 2 is via an input and output device 4, which is also mounted within the chamber and in some circumstances conveniently forms part of the wall of the chamber itself. The unit 4 also contains photo sensitive elements 6 by means of which communication signals and data information can be fed to it from the processor units 2 and also optical emissive devices 7 by means of which information can be entered into the processor arrangement as a whole. The unit 4 is provided with conventional conductive leads 5, which link it to other external parts of a system of which the processor arrangement forms a part.

The processor units 2 communicate amongst themselves by optical means. The nature of the optical transmitters and receivers is described with reference to FIG. 2, but it should be noted that in FIG. 1 the optical transmitting and receiving devices on all processor units 2 are positioned so as to permit any one processor unit to communicate directly with all other processor units.

It is desirable that the operation of all processor units 2 is synchronised and this is achieved by modulating the light emitted by the light source 3 with a synchronisation clock signal. This may take the form of an appropriate frequency modulation of the light. The use of common clock synchronisation signals permits the different processor units 2 to communicate with each other and with the unit 4 in a time division multiplex form. In this system of communication, each processor unit 2 is allocated a unique time slot within which it is allowed to transmit, thereby avoiding interference with the operation of other independently operating processor units. Alternatively frequency division multiplex could be used with sufficiently frequency selective light emitters.

Although in FIG. 1 the substrate 1 is shown as being flat, this is not necessarily its best or only configuration and to facilitate each processor unit 2 having a direct line of sight with as many other processor units 2 as possible, the substrate 1 can be curved so as to form part of a concave surface. The degree of curvature necessary can be fairly small. Alternatively, the degree of curvature can be very marked so that in effect the substrate 1 surrounds the common light source 3 and in this arrangement the unit 4 can be conveniently positioned at one or other of the ends of the part cylindrical body so formed.

The arrangement shown in FIG. 1 totally avoids the need to provide conductive leads interconnecting the different processor units 2. However, it is convenient to provide the power to the processor units by means of common bus bars on which the processor units are mounted. The bus bars are relatively simple, robust, and very few in number and need not add significantly to the complexity or reduce the reliability of the processor arrangement. The data communication between the individual processor units 2 and with the unit 4 is by optical means as previously.

In principle the individual processor units 2 may be located in three dimensional space provided that suitable provision is made for permitting optical communication between any one processor unit and at least its most closely adjacent neighbours. In this case each neighbour can act as a repeater station in respect of a signal intended for a more distantly located processor unit.

Each processor unit 2 can be assigned initially a unique address, by means of which data intended for it can be unambiguously identified. Alternatively the network of processor units 2 themselves can assign individual identities, possibly on a changing basis in response to the needs of the system.

Figure 2:
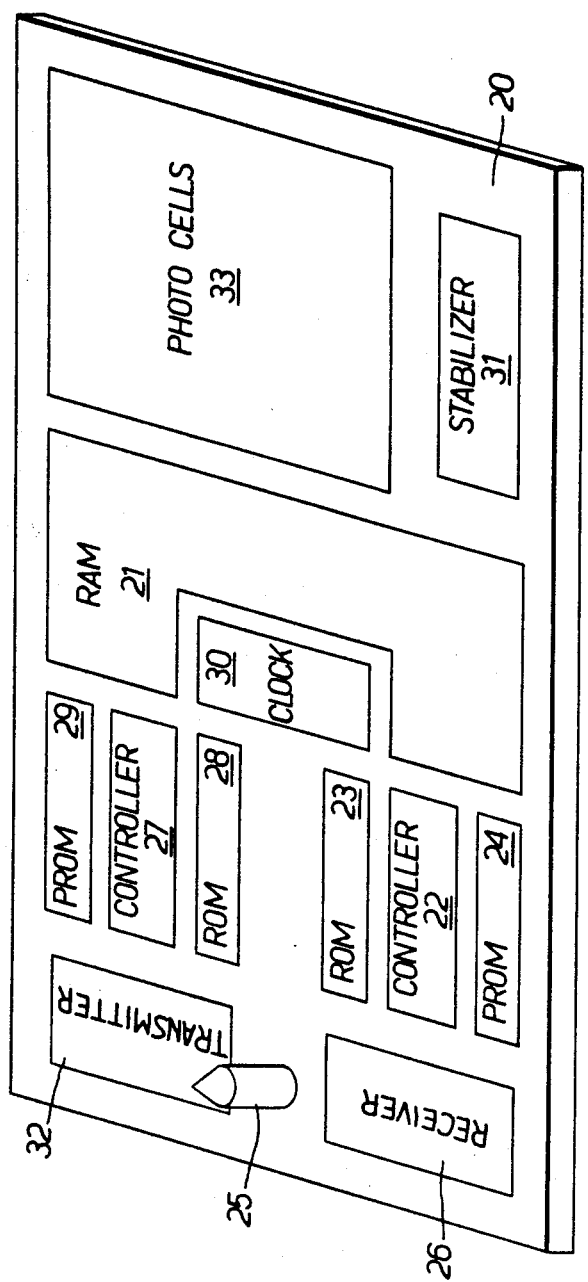

FIG. 2 shows in a diagrammatic manner the layout of an individual processor unit 2 which forms part of the arrangement shown in FIG. 1. In practice, a large number of these units 2 could be provided and arranged so as to communicate with each other.

Referring to FIG. 2, the processor unit 2 comprises a stable substrate 20 on which the individual portions of the processor are formed. The substrate 20 may be a localised region of substrate 1, or alternatively could be small areas mounted on substrate 1. Typically, the substrate 20 consists of a defused plate of crystalline silicon with the individual processor functions being formed by an appropriate defusion of implantation of group III or group IV impurities. The processor unit 2 contains a large memory which is arranged to operate as a random access memory (RAM) 21 with information being entered into this memory and read out by means of a logic controller 22. The logic controller 22 could itself be a microprocessor element and contains computational capacity. The logic controller 22 is provided with an associated read only memory (ROM) 23 and a programmable read only memory (PROM) 24. The ROM 23 contains data which is essential to the fundamental operation of the system and which throughout the normal life of the system does not vary. The programmable read only memory 24 also contains information which is necessary to enable the logic controller 22 to perform its required functions, but in this case provision is made to enable the operating instructions to be up-dated as necessary. In particular, the address which enables the processor unit 2 to be identified may be changed or up-dated from time to time. The information which the processor unit 2 receives is obtained via an optical device 25 and an associated receiver 26. The optical device 25 comprises a conical optical prism with a pair of photodiodes located at its base. One of these photodiodes is arranged to be sensitive to received illumination, whilst the other is arranged to be a light emissive diode. The diodes are, of course, arranged to operate in the appropriate part of the spectrum and if required would be infra-red diodes. The information is entered into the memory 21 by the logic controller 22 and is operated on as necessary by a further logic controller 27 in accordance with required functions. This logic controller 27 is provided with its own read only memory 28 and programmable read only memory 29, which are analogous to the memories 23 and 24. The operation of the processor as so far described is synchronised by an internal clock source 30. The energy necessary to operate the processor unit 2 is received via an array of photo cells 33, which receive the light radiated by the common source of illumination shown in FIG. 1. This illumination is received at a relatively high level and contains a frequency modulation by means of which the frequency of the clock source 30 can be locked to a common clock frequency for the whole arrangement. The energy which is derived by the photo cells 33 is passed to a stabiliser 31, which can take the form of a voltage regulation device to prevent undue variations in the voltage which drives the operation of the processor. The stabiliser 31 is provided with an energy storage capability so as to maintain operation for short periods even if the illumination received by the photo cells 33 is temporarily interrupted. Additionally, this enables the processor unit 2 to close down operation in an orderly fashion to prevent the loss of viable data if for any reason the illumination source 3 fails.

The information which is produced within the processor unit 2 is transmitted to other processes via a transmitting circuit 32 and the light emitting diode which forms part of the optical device 25.

Each processor unit 2 is allocated a particular time slot for its data transmission, which includes an appropriate address code so that the message can be identified by the processor for which it was intended. In some circumstances, it may be possible to permit more than a single processor to transmit simultaneously, but in this case the nature of the transmission may be such that the intended recipient can be unambiguously identified.

Figure 3:
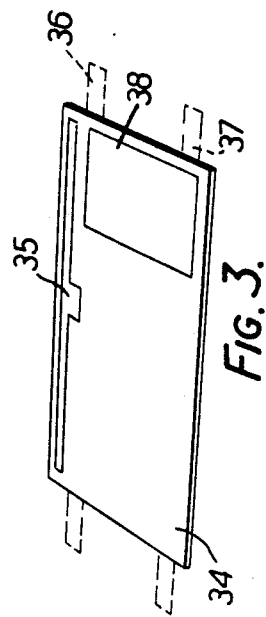

In FIGS. 1 and 2, the processor units forming part of an overall processor arrangement communicate one with another at optical frequencies, typically in the near infra-red part of the electro-magnetic spectrum. In an alternative embodiment of this invention, the processor units communicate at much lower frequencies. Typically, the wavelength of the electro-magnetic waves used for this purpose are of the order of the dimensions of the individual processors and the energy can be received and transmitted by the processor units 34 by means of small dipole antennas 35 as shown in FIG. 3. These antennas can be formed on the surface of the processor units 34 as simple conductive tracks. If the processor units are individually very small, then clearly very high microwave frequencies would be required. It is expected that in practice the microwave frequencies may adversely interfere with the internal operation of the individual microprocessor units unless the frequencies are very carefully chosen and it may be more desirable to relay on optical communications.

In the arrangement shown in FIG. 3, the energy necessary to operate the individual processor units 34 may be provided by common bus bars 36 and 37, (shown in broken line), but it is preferred to provide each processor unit instead with a photo cell array 38, which corresponds to the photo cells 33 shown in FIG. 2. In this case it would be necessary to provide a common light source for the processor arrangement to illuminate all of the individual processor units and in addition to provide dipole antennas on the input-output devices (corresponding to device 4 of FIG. 1) to enable it to communicate with all of the individual processor units 34.

In FIG. 1, the lay-out of the processor arrangement is in the form of a regular tessellated array of processor units. A regular array of this kind can enable individual processor units to be unambiguously identified by their position in the array. However, the regularity of the array may pose problems in arranging line of sight optical communication between the different processor units and for this reason an irregular staggered array may be preferred. Furthermore, to reduce the overall dimensions of the processor arrangement, the array of processor units can be extended in three dimensions provided that suitable provision is made, e.g. by means of optical reflectors or optical light guides, to enable the processors to communicate one with another.

I claim:

1. A processor arrangement including a plurality of individual processors mounted within a common chamber, each said individual processor comprising means for freely radiating electromagnetic waves, directly without regeneration, to a plurality of other ones of said individual processors, and means having an omnidirectional receiving characteristic disposed for receiving, directly without regeneration, electromagnetic waves from a plurality of other ones of said individual processors, with data communication between said individual processors being by means of the radiated electromagnetic waves.

2. An arrangement as claimed in claim 1 and wherein said radiating and receiving means enable each said individual processor to communicate directly by means of electromagnetic waves with all of the remaining ones of said individual processors.

3. An arrangement as claimed in claim 1 and wherein said processors are provided with the energy necessary to operate them via conductive leads which are physically attached to them.

4. An arrangement as claimed in claim 1 and wherein the individual processors are all similar and capable of independent autonomous operation.

5. An arrangement as claimed in claim 1 and wherein said processors are provided with the energy necessary to operate them by the radiation to them of electromagnetic energy.

6. An arrangement as claimed in claim 5 and wherein the radiated electromagnetic energy is at microwave frequencies.

7. An arrangement as claimed in claim 6 and wherein the wavelength of the energy is of the order of the largest dimension of each individual processor.

8. An arrangement as claimed in claim 1 and wherein the radiated electromagnetic waves are in the form of light.

9. An arrangement as claimed in claim 8 and wherein each said processor is provided with the energy necessary to operate it from a common light emissive source which is arranged to illuminate all of said individual processors.

10. An arrangement as claimed in claim 9 and wherein the light energy is modulated so as to impart a common reference clock frequency to each processor.

11. An arrangement as claimed in claim 8 further comprising reflecting means disposed for reflecting light from said radiating means of one said individual processor to said receiving means of at least one other of said individual processors.

12. An arrangement as claimed in claim 1 wherein said radiating means are constructed for radiating omnidirectionally in at least one plane.

13. An arrangement as claimed in claim 12 wherein the electromagnetic waves are in the form of light, all of said individual processors are disposed in a common plane, and said radiating and receiving means of each said individual processor comprise a light radiating and receiving element.

14. An arrangement as claimed in claim 13 wherein said common plane is curved and said light radiating and receiving element of each said individual processor is located at the concave side of said common plane.

15. An arrangement as claimed in claim 13 wherein said light radiating and receiving element of each said individual processor comprises a light conductor projecting from said common plane for radiating and receiving with respect to all directions parallel to said common plane.

16. An arrangement as claimed in claim 15 wherein said light conductor of each said individual processor comprises a conical optical prism oriented with its axis perpendicular to said common plane.

17. A processor arrangement comprising: a plurality of individual processors mounted within a common chamber; means associated with each said individual processor for establishing data communication by means of modulated electromagnetic waves between said individual processors; and a common electromagnetic wave emissive source arranged to illuminate all of said individual processors and providing electromagnetic energy which is modulated to impart a common reference clock frequency to all of said individual processors.

18. An arrangement as defined in claim 17 wherein the electromagnetic waves are in the form of light.

19. An arrangement as claimed in claim 18 wherein all of said individual processors obtain the energy needed to operate them from received light energy, and the light energy for operating each said individual processor is provided by said common emissive source.

* * * * *